United States Patent
Okura

(10) Patent No.: US 10,644,278 B2
(45) Date of Patent: May 5, 2020

(54) BATTERY ASSEMBLY AND HOLDER

(71) Applicant: TOYOTA JIDOSHA KABUSHIKI KAISHA, Toyota-shi, Aichi-ken (JP)

(72) Inventor: Toshinori Okura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 597 days.

(21) Appl. No.: 14/951,995

(22) Filed: Nov. 25, 2015

(65) Prior Publication Data

US 2016/0149174 A1 May 26, 2016

(30) Foreign Application Priority Data

Nov. 26, 2014 (JP) ................................. 2014-238799

(51) Int. Cl.
*H01M 2/10* (2006.01)
*H01M 10/54* (2006.01)

(52) U.S. Cl.
CPC ......... *H01M 2/105* (2013.01); *H01M 2/1077* (2013.01); *H01M 10/54* (2013.01); *Y02W 30/84* (2015.05)

(58) Field of Classification Search
CPC .................................................... H01M 2/105
See application file for complete search history.

(56) References Cited

U.S. PATENT DOCUMENTS

2013/0122341 A1* 5/2013 De Paoli ............... H01M 2/105
429/99
2013/0270749 A1 10/2013 Hachtmann et al.

FOREIGN PATENT DOCUMENTS

| CN | 103038916 A | 4/2013 |
|---|---|---|
| JP | 2738456 B2 | 1/1998 |
| JP | 2010-009798 A | 1/2010 |
| JP | 2013008655 A | 1/2013 |
| JP | 2013532890 A | 8/2013 |
| JP | 2013243123 A | 12/2013 |

* cited by examiner

Primary Examiner — Ula C Ruddock
Assistant Examiner — Thomas H. Parsons
(74) Attorney, Agent, or Firm — Sughrue Mion, PLLC

(57) ABSTRACT

An battery assembly includes: a holder having a front surface and a back surface and having a plurality of holding holes, which are cylindrical holes penetrating through between the front surface and the back surfaces; and a cylindrical battery extending in an axis direction and having an outside diameter smaller than an inside diameter of the holding hole, wherein: the holder is configured such that at least part of the battery is accommodated in the holding hole; the battery assembly includes an adhesive provided between an outer peripheral surface of the part of the battery and an inner peripheral surface of the holder so as to fix the battery to the holder; and the holder has grooves each of which is opened on the front surface or the back surface of the holder, each of the grooves making adjacent holding holes among the plurality of holding holes with each other.

8 Claims, 13 Drawing Sheets

BATTERY ASSEMBLY AND HOLDER

INCORPORATION BY REFERENCE

The disclosure of Japanese Patent Application No. 2014-238799 filed on Nov. 26, 2014 including the specification, drawings and abstract is incorporated herein by reference in its entirety.

BACKGROUND OF THE INVENTION

1. Field of the Invention

The present invention relates to an assembled battery and a holder to be used therein.

2. Description of Related Art

There has been known an assembled battery configured such that a plurality of cells is fixed to a holder. For example, Japanese Patent Application Publication No. 2010-009798 (JP 2010-009798 A) describes an assembled battery including a plurality of cylindrical batteries and a resin holder having a plurality of recessed portions into which the batteries are inserted. Around the recessed portion, there is an elastically deformable portion that elastically deforms outwardly in a radial direction of the battery by being pressed outwardly in the radial direction of the battery by an outer peripheral surface of the battery when the battery is inserted into the recessed portion. On this account, the battery thus inserted into the recessed portion is held by the elastically deformable portion in a state where the battery is pressed inwardly in the radial direction by a restoring force (a reaction force) of the elastically deformable portion that elastically deforms outwardly in the radial direction. In the assembled battery of JP 2010-009798 A, the battery is fixed to the holder in such a state.

Further, an assembled battery includes: a holder having a front surface and a back surface and having a plurality of holding holes, which are cylindrical holes penetrating through between the front surface and the back surface; and cylindrical batteries each extending in an axis direction, having an outside diameter smaller than an inside diameter of the holding hole, and inserted into the holding hole. In the assembled battery, in order to fix the battery inside the holding hole of the holder, an outer peripheral surface of that part of the battery which is placed inside the holding hole is joined, by an adhesive, to that inner peripheral surface of the holder which constitutes the holding hole.

SUMMARY OF THE INVENTION

In the meantime, in order to appropriately recycle components (an electrode material, and the like) of a battery included in an assembled battery, it has been required in recent years that the battery can be taken out of a holder (the battery can be separated from the holder). However, in the above assembled battery, the battery is fixed to the holder in a state where the outer peripheral surface of the battery is joined, by an adhesive, to the inner peripheral surface of the holding hole. In such an assembled battery, the battery is firmly fixed to the holder, so the battery is hard to be pulled out from the holding hole of the holder.

The present invention provides an assembled battery configured such that a battery can be easily taken out of a holder (the holder can be easily separated from the battery), and a holder having a structure in which a battery can be easily taken out therefrom (the battery can be easily separated therefrom).

A battery assembly according to a first aspect of the present invention includes: a holder having a front surface and a back surface and having a plurality of holding holes, which are cylindrical holes penetrating through between the front surface and the back surface; and a cylindrical battery extending in an axis direction and having an outside diameter smaller than an inside diameter of the holding hole, wherein: the holder is configured such that at least part of the battery is accommodated in the holding hole; the battery assembly includes an adhesive provided between an outer peripheral surface of the part of the battery and an inner peripheral surface of the holder so as to fix the battery to the holder, the part of the battery being placed inside the holding hole, and the inner peripheral surface of the holder constituting the holding hole; and the holder has grooves each of which is opened on the front surface or the back surface of the holder, each of the grooves making adjacent holding holes among the plurality of holding holes communicate with each other.

The above battery assembly includes the holder having a plurality of cylindrical holding holes, and the cylindrical batteries each configured such that at least part thereof is accommodated in the holding hole (inserted into the holding hole). Further, the above battery assembly includes the adhesive provided between the outer peripheral surface of that part of the battery which is placed inside the holding hole and that inner peripheral surface of the holder which constitutes the holding hole, so as to fix the battery to the holder. That is, the battery is fixed to the holder in a state where the outer peripheral surface of the battery is joined, via the adhesive, to that inner peripheral surface of the holder which constitutes the holding hole. In such an battery assembly, the battery is firmly fixed to the holder, so the battery is hard to be pulled out from the holding hole of the holder. However, as described above, in order to appropriately recycle components (an electrode material, and the like) of the battery included in the battery assembly, it is required that the battery can be taken out of the holder (can be separated from the holder).

In this regard, in the above battery assembly, the holder has grooves each of which is opened on the front surface or the back surface of the holder and each of which communicates adjacent holding holes, among the plurality of holding holes formed in the holder, with each other. In other words, a groove that is opened on the front surface or the back surface of the holder is formed in that hole surrounding portion of the holder which is placed around the holding hole, and the groove communicates the holding hole thus surrounded by the hole surrounding portion with its adjacent holding hole (the groove is formed in a hole surrounding portion of each of the holding holes formed in the holder).

Accordingly, when an impact is applied to the holder of the above battery assembly, a crack occurs between adjacent holding holes (in a range from a bottom face of the groove to a surface opposite to a holder surface on which the groove is opened, in a thickness direction of the holder) in the holder, starting from the groove. By dividing the holder (the battery assembly) by taking, as a boundary, cracks thus caused and that part of the inner peripheral surface of the holding hole which is placed between cracks adjacent to each other in a circumferential direction of the holding hole (or an inner peripheral surface of the adhesive joined to this part of the inner peripheral surface), the outer peripheral surface of that part (referred to as a hole-inside part) of the battery which is placed inside the holding hole (or the surface of the adhesive adhered to the outer peripheral surface of the hole-inside part) can be partially exposed outside, in terms of the battery inserted into the holding hole to which the grooves as starting points of the cracks are connected. Thus, the battery in which the outer peripheral surface of the hole-inside part (or the surface of the adhesive adhered to the outer peripheral surface of the hole-inside part) is partially exposed can be easily taken out from the holder (easily separated from the holder).

Thus, in terms of all the batteries fixed to the holder, the outer peripheral surface of that part thereof which is placed inside the holding hole (or the surface of the adhesive adhered to the outer peripheral surface of the hole-inside part) is partially exposed outside, thereby making it possible for all the batteries to be easily taken out from the holder (easily separated from the holder).

Note that the "cylindrical shape" of the holding hole includes not only a "linear cylindrical shape" in which the inner peripheral surface constituting the holding hole extends straight in an axis direction, but also a "diagonal cylindrical shape" in which the inner peripheral surface constituting the holding hole is a tapered surface (a surface extending in a diagonal direction in which the inner peripheral surface forms an angle relative to the axis). Further, the grooves may be provided in all sets of two adjacent holding holes in the holder (accordingly, all holding holes adjacent to each other in the holder are communicated with each other via the grooves). Further, the grooves may be provided except some sets of two adjacent holding holes in the holder (including a set of holding holes that are not communicated with each other via a groove, among the sets of two adjacent holding holes).

Moreover, the above battery assembly may be a battery assembly configured such that the holder has grooves which are opened on the front surface or the back surface of the holder and which extend to an outer peripheral side surface of the holder from an outer-peripheral-side holes among the holding holes which are placed adjacent to the outer peripheral side surface of the holder.

In the above battery assembly, the holder has the grooves which are opened on the front surface or the back surface of the holder and which extend to the outer peripheral side surface of the holder from those outer-peripheral-side holes among the holding holes which are placed adjacent to the outer peripheral side surface of the holder. Hereby, the holder can be wholly divided (split) starting from the grooves, which allows all the batteries (particularly, the batteries inserted into the outer-peripheral-side holes) fixed to the holder to be easily taken out from the holder (to be easily separated from the holder).

Further, any of the above assembled batteries may be a battery assembly in which: the grooves are configured to extend in a radial direction of the holding hole; the holder is configured such that a plurality of grooves extends from each of the holding holes formed in the holder; and when a plurality of grooves extending from the holding hole in its radial direction is viewed in a plan view from that front-surface or back-surface side of the holder on which the grooves are opened, an angle formed between any two grooves adjacent to each other in a circumferential direction of the holding hole is 180° or less.

In the above battery assembly, each of the grooves is configured to extend in the radial direction of the holding hole. Further, a plurality of grooves extends from each of the holding holes formed in the holder. In other words, a plurality of grooves configured to extend in the radial direction of the holding hole is connected, as the grooves, to each of the holding holes formed in the holder. When a plurality of grooves extending from the same holding hole in the radial direction is viewed in a plan view from a front-surface side or a back-surface side of the holder on which the grooves are opened, an angle formed between two adjacent grooves is 180° or less. Hereby, when an impact is applied to the holder so that cracks are caused between adjacent holding holes, starting from the grooves, the holder (the battery assembly) can be easily divided by taking, as a boundary, the cracks and that part of the inner peripheral surface of the holding hole which is placed between cracks adjacent to each other in the circumferential direction of the holding hole (or the inner peripheral surface of the adhesive joined to this part of the inner peripheral surface). This is because such a problem does not occur that, at the time of dividing of the holder, the battery placed at the boundary abuts with the inner peripheral surface of the holding hole and prevents the dividing of the holder.

Further, by removing one or more parts of the holder which are sandwiched between those grooves adjacent to each other in the circumferential direction of the holding hole in which cracks are caused (in addition, a part that includes at least half of a circumference of the inner peripheral surface of the holding hole), a part corresponding to at least half (with a central angle of 180° or more) of a circumference of the outer peripheral surface of that part of the battery inserted into the holding hole which is placed inside the holding hole (or the surface of the adhesive adhered to the outer peripheral surface of the hole-inside part) can be exposed outside. This accordingly allows the battery to be more easily taken out from the holder (easily separated from the holder), in the above battery assembly.

Note that the "angle formed between two grooves adjacent to each other in the circumferential direction of the holding hole" indicates an angle formed by center lines of two grooves adjacent to each other when the holder is viewed in a plan view from that front-surface or back-surface side of the holder on which the two grooves are opened (i.e., center lines in the width direction; note that the center lines are segments having a length extending to a center of the holding hole).

Further, in a case where only two grooves extending from the same holding hole are formed, there are two angles formed between the two grooves adjacent to each other in the circumferential direction of the holding hole (i.e., an angle in a case where the circumferential direction from one of the grooves to the other one of the grooves is clockwise, and an angle in a case where the circumferential direction is counterclockwise), and the angles are both 180° or less. That is, in this case, the angle formed by the two grooves adjacent to each other is 180°.

Further, in any of the above assembled batteries, a depth of the grooves may be half of a dimension between the front surface and the back surface in the holder.

The above battery assembly can balance the strength of the holder with easy separation at the time of disassembly.

Further, in any of the above assembled batteries, the adhesive may be provided between a bottom face of one of the groove and an opposite surface of a surface on which the groove is opened.

In the above battery assembly, since the adhesive is not provided in the groove, the battery can be more easily separated from the holder.

A holder according to a second aspect of the present invention is configured such that: the holder has a front surface and a back surface; plurality of holding holes, which are cylindrical holes penetrating through between the front surface and the back surface, are formed; at least part of a cylindrical battery is able to be accommodated in the holding hole; and the holder has grooves each of which is opened on the front surface or the back surface, each of the grooves making adjacent holding holes among the plurality of holding holes communicate with each other.

The above holder can constitute the above battery assembly. More specifically, by inserting a cylindrical battery into the holding hole of the holder, and joining, by an adhesive, an outer peripheral surface of that part of the battery which is placed inside the holding hole, to that inner peripheral surface of the holder which constitutes the holding hole, such an battery assembly that the battery is fixed to the holder can be formed.

In the meantime, the holder has the grooves each of which is opened on the front surface or the back surface of the holder and each of which communicates adjacent holding holes among the plurality of holding holes with each other. In other words, a groove that is opened on the front surface or the back surface of the holder is formed in a hole surrounding portion placed around the holding hole, and the groove communicates the holding hole surrounded by the hole surrounding portion with its adjacent holding hole (the groove is formed in a hole surrounding portion of each of the holding holes formed in the holder).

Accordingly, in terms of the above battery assembly manufactured by use of the holder as such, when an impact is applied to the holder, cracks are caused between adjacent holding holes in the holder, starting from the grooves. By dividing the holder (the battery assembly) by taking, as a boundary, the cracks thus caused and that part of the inner peripheral surface of the holding hole which is placed between cracks adjacent to each other in the circumferential direction of the holding hole (or an inner peripheral surface of the adhesive joined to this part of the inner peripheral surface), the outer peripheral surface of that part (referred to as a hole-inside part) of the battery which is placed inside the holding hole (or the surface of the adhesive adhered to the outer peripheral surface of the hole-inside part) can be partially exposed outside, in terms of the battery inserted into the holding hole to which the grooves as starting points of the cracks are connected. Thus, the battery in which the outer peripheral surface of the hole-inside part (or the surface of the adhesive adhered to the outer peripheral surface of the hole-inside part) is partially exposed can be easily taken out from the holder (easily separated from the holder).

Thus, in terms of all the batteries fixed to the holder, the outer peripheral surface of that part thereof which is placed inside the holding hole (or the surface of the adhesive adhered to the outer peripheral surface of the hole-inside part) is partially exposed outside, thereby making it possible for all the batteries to be easily taken out from the holder (easily separated from the holder). Further, it can be said that the holder is a holder having a structure in which the battery is easily taken out therefrom (easily separated therefrom).

Note that the grooves may be provided in all sets of two adjacent holding holes in the holder (accordingly, all holding holes adjacent to each other in the holder are communicated with each other via the grooves). Further, the grooves may be provided except some sets of two adjacent holding holes in the holder (including a set of holding holes that are not communicated with each other via a groove, among the sets of two adjacent holding holes).

Further, the holder may be a holder having grooves which are opened on the front surface or the back surface of the holder and which extend to an outer peripheral side surface of the holder from an outer-peripheral-side holes among the holding holes which are placed adjacent to the outer peripheral side surface of the holder.

The holder has the grooves which are opened on the front surface or the back surface of the holder and which extend to the outer peripheral side surface of the holder from those outer-peripheral-side holes among the holding holes which are placed adjacent to the outer peripheral side surface of the holder. Hereby, the holder can be wholly divided (split) starting from the grooves. Accordingly, in the battery assembly manufactured by use of the holder as described above, all the batteries (particularly, the batteries inserted into the outer-peripheral-side holes) fixed to the holder can be easily taken out from the holder (easily separated from the holder).

Further, any of the above holder may be a holder in which the grooves are configured to extend in a radial direction of the holding hole; plurality of grooves extends from each of the holding holes formed in the holder; and when plurality of grooves extending from the holding hole in its radial direction is viewed in a plan view from a front-surface side or a back-surface side of the holder on which the grooves are opened, an angle formed between any two adjacent grooves is 180° or less.

In the above holder, each of the grooves is configured to extend in the radial direction of the holding hole. Further, a plurality of grooves extends from each of the holding holes formed in the holder. In other words, a plurality of grooves configured to extend in the radial direction of the holding hole is connected, as the grooves, to each of the holding holes formed in the holder. When a plurality of grooves extending from the same groove in the radial direction is viewed in a plan view from that front-surface or back-surface side of the holder on which the grooves are opened, an angle formed between two grooves adjacent to each other in the circumferential direction of the holding hole is 180° or less.

Hereby, in the battery assembly manufactured by use of the above holder as described above, when an impact is applied to the holder so that cracks are caused between adjacent holding holes, starting from the grooves, the holder (the battery assembly) can be easily divided by taking, as a boundary, the cracks and that part of the inner peripheral surface of the holding hole which is placed between cracks adjacent to each other in the circumferential direction of the holding hole (or the inner peripheral surface of the adhesive joined to that part of the inner peripheral surface). This is because such a problem does not occur that, at the time of dividing of the holder, the battery placed at the boundary abuts with the inner peripheral surface of the holding hole and prevents the dividing of the holder.

Further, by removing one or more parts of the holder which are sandwiched between those grooves adjacent to each other in the circumferential direction of the holding hole in which cracks are caused (in addition, a part that includes at least half of a circumference of the inner peripheral surface of the holding hole), a part corresponding to at least half (with a central angle of 180° or more) of a circumference of the outer peripheral surface of that part of the battery inserted into the holding hole which is placed inside the holding hole (or the surface of the adhesive adhered to the outer peripheral surface of the hole-inside part) can be exposed outside. Accordingly, with the use of the holder, the battery can be still more easily taken out from the holder (easily separated from the holder).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
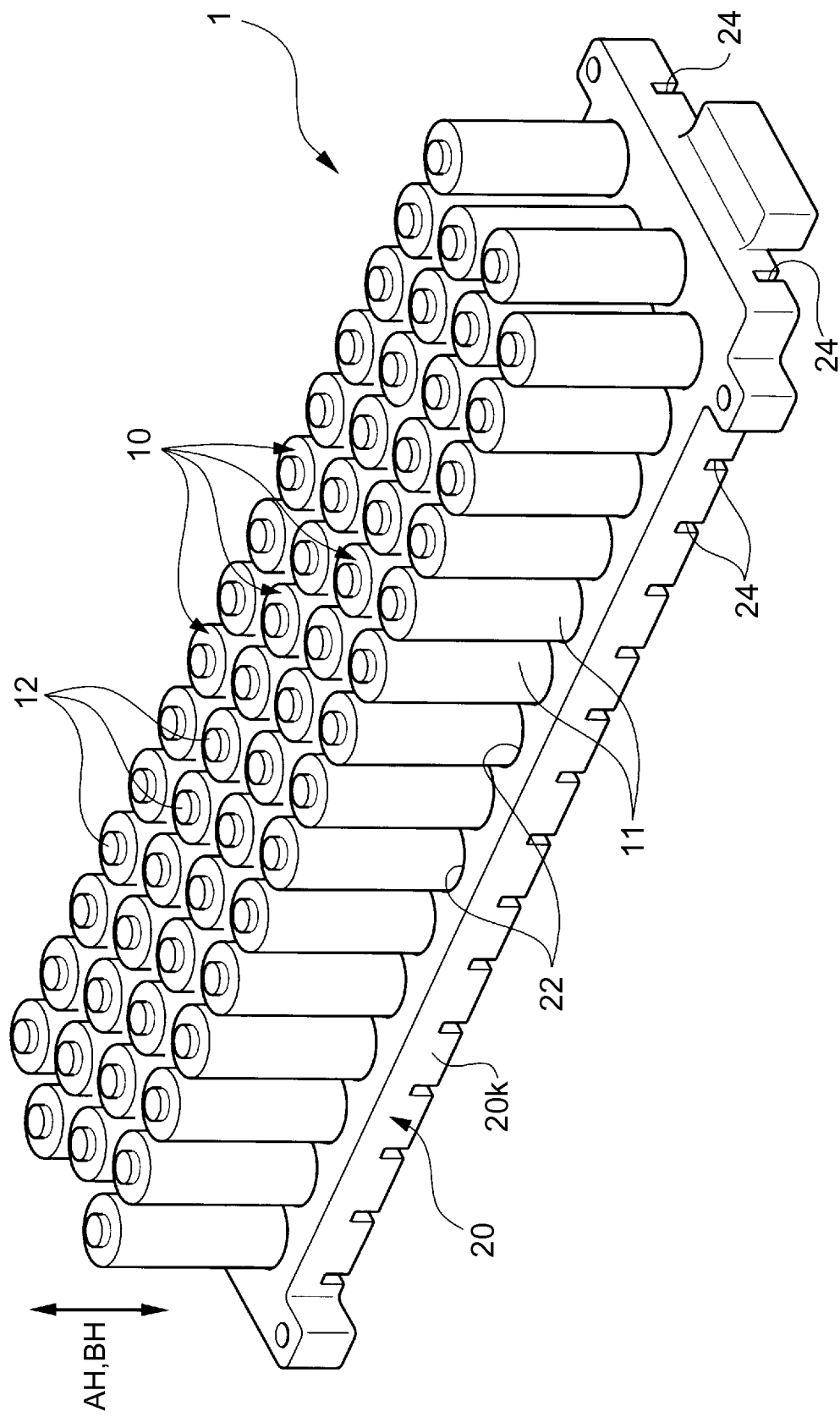
FIG. 1 is a perspective view of a battery assembly according to an embodiment.
Figure 2:
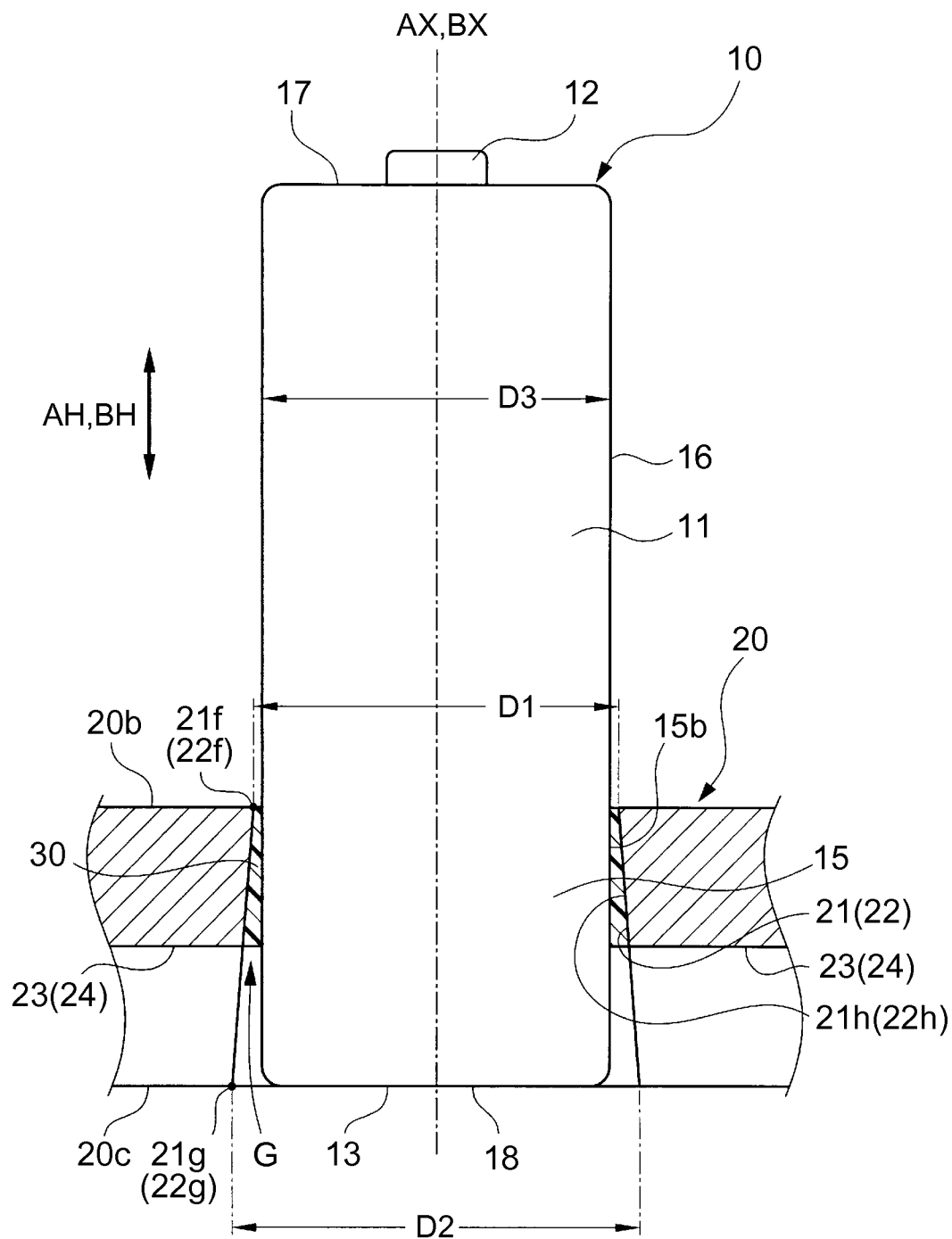
FIG. 2 is an enlarged partial sectional view of the battery assembly.
Figure 3:
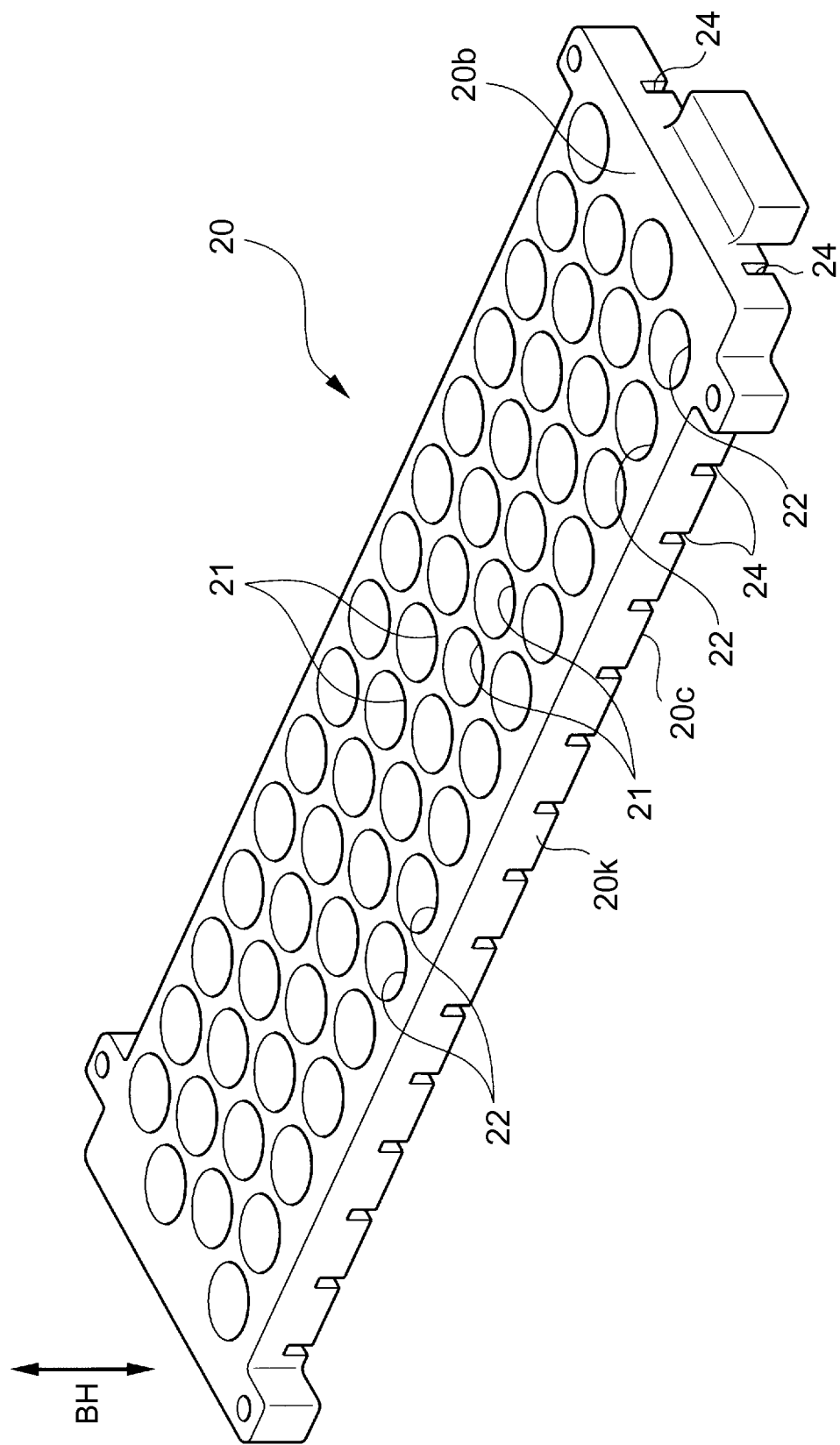
FIG. 3 is a perspective view of a holder.
Figure 4:
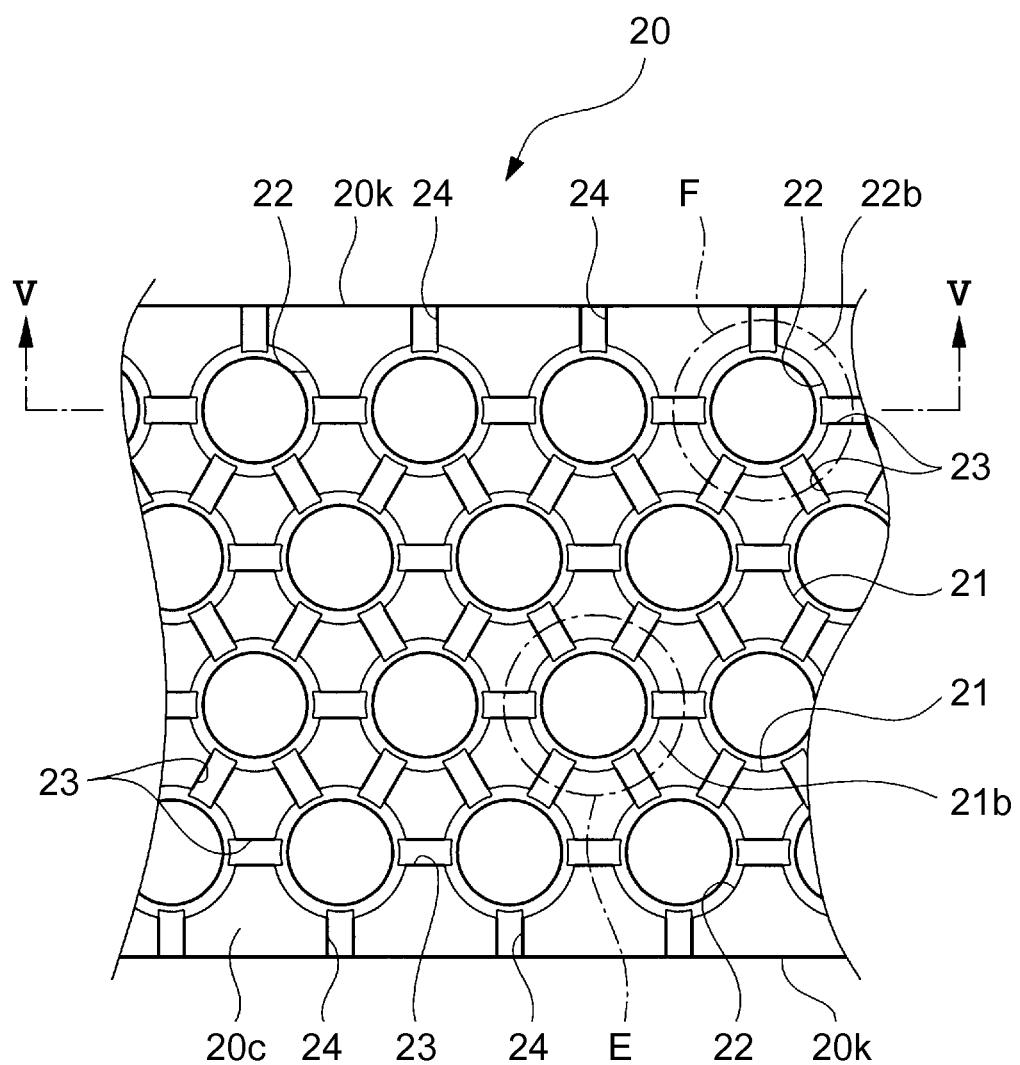
FIG. 4 is a plan view (a back-surface side) of the holder.

Next will be described an embodiment of the present invention with reference to the drawings. FIG. 1 is a perspective view of a battery assembly 1 according to an embodiment. FIG. 2 is an enlarged partial sectional view of the battery assembly 1. FIG. 3 is a perspective view of a holder 20. FIG. 4 is a plan view (illustrating part of the holder 20) of the holder 20 when viewed from a back-surface-20c side. As illustrated in FIG. 1, the battery assembly 1 of the present embodiment includes the holder 20 and a plurality of batteries 10 fixed to the holder 20.

The battery 10 is a cylindrical (pillar-shaped) lithium-ion secondary battery (more specifically, a 18650-type lithium-ion secondary battery) extending in an axis direction AH (a direction along an axis AX of the battery). The battery 10 is a single cell, and includes a cylindrical battery outer case 11, and an electrode body (not shown) and a nonaqueous electrolyte (not shown) accommodated inside the battery outer case 11. The electrode body is a wound electrode body formed such that a belt-shaped separator (not shown) is provided between a belt-shaped positive plate (not shown) and a belt-shaped negative plate (not shown), and then wound in a cylindrical manner.

Further, as illustrated in FIG. 2, the battery 10 has a first surface 17 on one end side (an upper end side in FIG. 2) in the axis direction AH, a second surface 18 placed on the other side end (a lower end side in FIG. 2) in the axis direction AH, and an outer peripheral surface 16 placed between the first surface 17 and the second surface 18. A projecting positive terminal 12 electrically connected to the positive plate of the electrode body inside the battery is provided on the first surface 17 (a top face in FIG. 2) of the battery 10. Further, the second surface 18 (a lower face in FIG. 2) of the battery 10 serves as a negative terminal 13 electrically connected to the negative plate of the electrode body inside the battery.

The holder 20 is made of a single metal member (e.g., aluminum) having a flat shape, and has a front surface 20b and a back surface 20c. As illustrated in FIGS. 3, 4, a plurality of cylindrical (more specifically, oblique cylindrical) holding holes 21, 22, which are holes penetrating through between the front surface 20b and the back surface 20c, is formed in the holder 20. These holding holes 21, 22 are arranged in a hound's tooth check, in a plan view of the holder 20.

Note that, among the holding holes formed in the holder 20, the holding holes 22 are "outer-peripheral-side holding holes" that are placed adjacent to an outer peripheral side surface 20k of the holder 20. In other words, the holding holes 22 are holding holes placed in an outer peripheral edge of the holder 20, and in FIG. 4, they are holding holes placed on an outer peripheral edge on an upper side of the holder 20 or an outer peripheral edge on a lower side thereof so as to be arranged in a right-left direction. In the meantime, among the holding holes formed in the holder 20, the holding holes 21 are holding holes (holding holes placed on a central side of the holder 20) other than the "outer-peripheral-side holding holes." Note that the holding holes 21 and 22 have the same shape.

Further, in the present embodiment, as illustrated in FIG. 2, an outside diameter D3 of the battery 10 is made smaller than a minimum inside diameter of the holding hole 21, 22 (more specifically, an inside diameter D1 of a front-surface-side open end 21f, 22f, which is an open end of the holding hole 21, 22 on a front-surface-20b side). This allows the battery 10 to be inserted into the holding hole 21, 22. In other words, the holder 20 is configured such that at least part of the battery 10 can be accommodated in the holding hole 21, 22. More specifically, part of the battery 10 is inserted into the holding hole 21, 22. In other words, the holder 20 is configured such that part of the battery 10 is accommodated in the holding hole 21, 22.

Further, as illustrated in FIG. 2, the battery assembly 1 of the present embodiment includes an adhesive 30 provided between an outer peripheral surface 15b of that part (referred to as a hole-inside part 15) of the battery 10 which is placed inside the holding hole 21, 22 and that inner peripheral surface 21h, 22h of the holder 20 which constitutes the holding hole 21, 22, so as to fix the battery 10 to the holder 20. The adhesive 30 is an adhesive injected and solidified in a gap G between the outer peripheral surface 15b of the hole-inside part 15 of the battery 10 and that inner peripheral surface 21h, 22h of the holder 20 which constitutes the holding hole 21, 22. Hereby, each of the batteries 10 is fixed to the holder 20 in a state where the each of the batteries 10 is joined, via the adhesive, to the inner peripheral surface 21h, 22h that constitutes the holding hole 21, 22.

Figure 6:
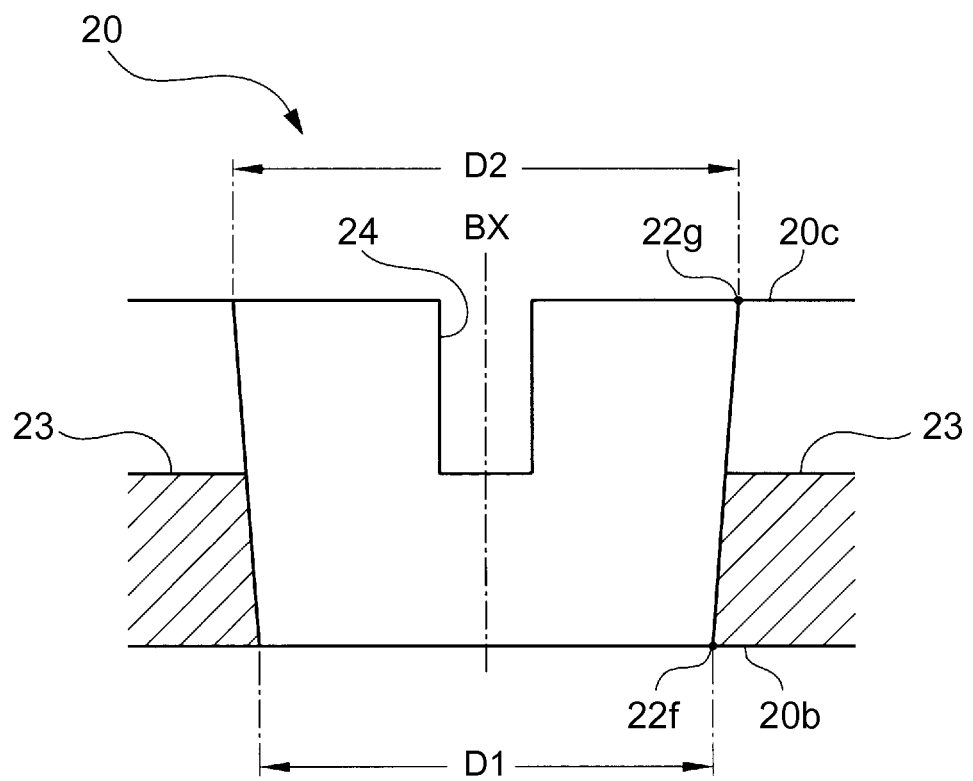
FIG. 6 is an enlarged view of a part C in FIG. 5.

Note that, in the battery assembly 1 of the present embodiment, the inside diameter D1 of the circular front-surface-side open end 21f, 22f, which is an open end of the holding hole 21, 22 on the front-surface-20b side, is made smaller than an inside diameter D2 of a circular back-surface-side open end 21g, 22g which is an open end of the holding hole 21, 22 on a back-surface-20c side (see FIGS. 2, 6). As such, since the inside diameter D2 (a diameter) of the back-surface-side open end 21g, 22g is made larger than the inside diameter D1 (a diameter) of the front-surface-side open end 21f, 22f, the adhesive 30 easily comes inside the gap G at the time when the adhesive 30 is injected into the gap G from the back-surface-20c side (see FIG. 13) in a state where the back surface 20c of the holder 20 is directed upward (the front surface 20b is directed downward), as will be described later. Further, since the inside diameter D1 of the front-surface-side open end 21f, 22f is smaller than the inside diameter D2 of the back-surface-side open end 21g, 22g, the adhesive 30 thus injected from the back-surface-20c side is hard to drop downward from the front-surface-20b side at the time when the adhesive 30 is injected into the gap G, as described above.

Besides, in the battery assembly 1 of the present embodiment, that inner peripheral surface 21h, 22h of the holder 20 which constitutes the holding hole 21, 22 is a tapered surface having an inside diameter that is increased from the front-surface-20b side toward the back-surface-20c side (see FIG. 6). On this account, when the adhesive 30 is injected into the gap G (see FIG. 13) as described above, the adhesive 30 thus injected from the back-surface-20c side easily flows toward the front-surface-20b side along the inner peripheral surface 21h, 22h, which makes it possible to smoothly fill the adhesive 30 into the gap G.

In the meantime, as described above, the battery assembly 1 of the present embodiment is configured such that the battery 10 is fixed to the holder 20 in a state where an outer peripheral surface 16 of the battery 10 (the outer peripheral surface 15b of the hole-inside part 15) is joined, via the adhesive 30, to that inner peripheral surface 21h, 22h of the holder 20 which constitutes the holding hole 21, 22. In such a battery assembly 1, the battery 10 is firmly fixed to the holder 20, so the battery 10 is hard to be pulled out from the holding hole 21, 22 of the holder 20.

However, in a case where the battery assembly 1 deteriorates along with use (in a case where the battery assembly 1 cannot be used normally), for example, it is required that the battery 10 be taken out of the holder 20 (the battery 10 is separated from the holder 20) in order to appropriately recycle components (an electrode material, and the like) of the battery 10 included in the battery assembly 1.

In this regard, in the battery assembly 1 of the present embodiment, grooves 23, 24 that are opened on the back surface 20c of the holder 20 are formed in a hole surrounding portion 21b, 22b placed around the holding hole 21, 22 in the holder 20, as illustrated in FIG. 4. That is, the holder 20 is configured such that the grooves 23, 24 that are opened on the back surface 20c of the holder 20 extend from each of the holding holes 21, 22 formed in the holder 20. In other words, the grooves 23, 24 that are opened on the back surface 20c of the holder 20 are connected to each of the holding holes 21, 22 formed in the holder 20.

Figure 5:
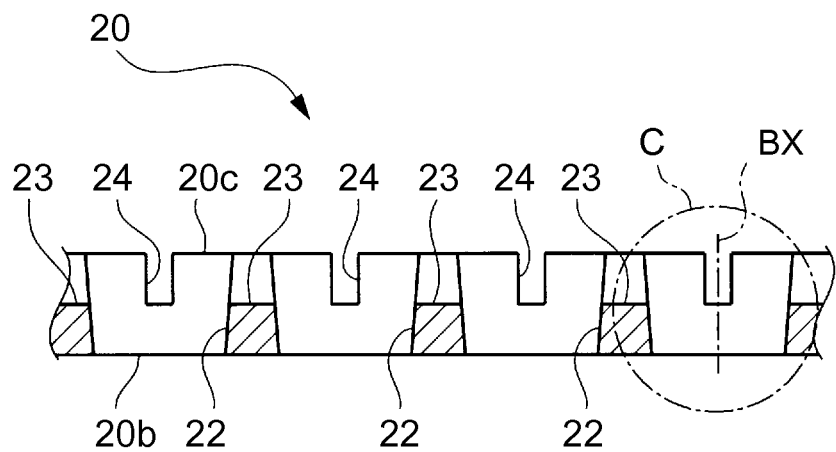
FIG. 5 is a sectional view taken along a line V-V in FIG. 4.

Note that, as illustrated in FIGS. 5 and 6, the grooves 23, 24 have a depth that is half of a thickness of the holder 20 (a dimension between the front surface 20b and the back surface 20c), and are not opened on the front surface 20b. Further, the adhesive 30 is filled into that part of the gap G which is placed on the front-surface-20b side relative to the grooves 23, 24.

The grooves 24 are grooves extending to the outer peripheral side surface 20k of the holder 20 from the holding holes 22 (the outer-peripheral-side holding holes placed adjacent to the outer peripheral side surface 20k of the holder 20; the holding holes placed on an upmost side or a lowest side and arranged in the right-left direction in FIG. 4). Note that, in the present embodiment, the grooves 24 are formed in all the holding holes 22 formed in the holder 20.

Further, the grooves 23 are grooves that communicate adjacent holding holes 21, 22 with each other among the plurality of holding holes 21, 22. In other words, the grooves 23 are grooves each communicating a holding hole 21, 22 surrounded by each hole surrounding portion 21b, 22b, with another holding hole 21, 22 adjacent to the holding hole 21, 22. Note that, in the present embodiment, the grooves 23 are provided in all sets of two adjacent holding holes 21, 22 in the holder 20. In other words, the grooves 23 are formed between each of the holding holes 21, 22 formed in the holder 20 and all holding holes 21, 22 adjacent to a radially outer side of the each of the holding holes 21, 22, so as to communicate those holding holes with each other. Accordingly, all holding holes 21, 22 adjacent to each other in the holder 20 are communicated with each other via the grooves 23.

Figure 9:
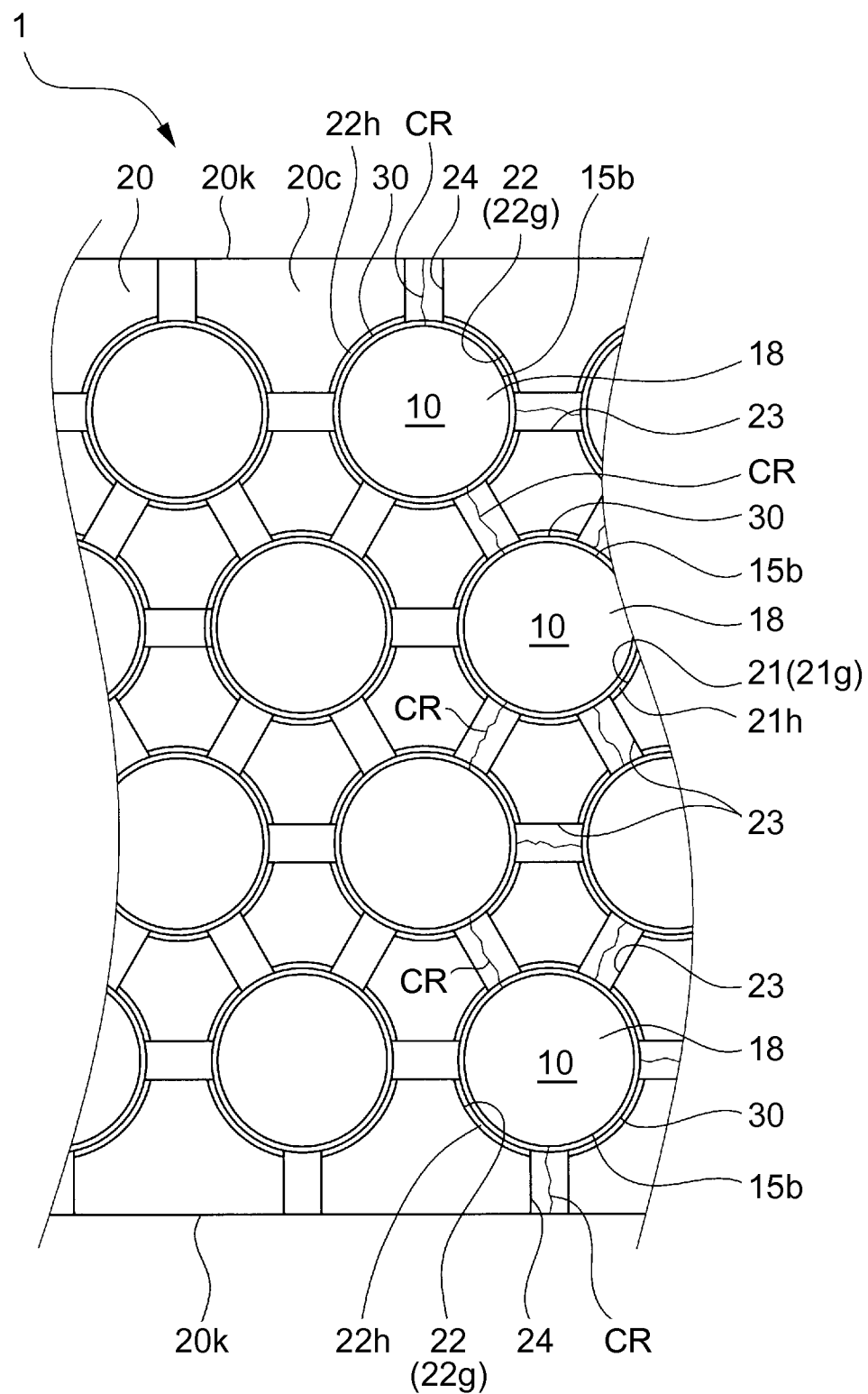
FIG. 9 is a view to describe a method of taking out a battery from the holder.

On this account, when an impact is given to the holder 20 of the battery assembly 1, a crack CR occurs between the holding hole 22 and the outer peripheral side surface 20k of the holder 20, starting from the groove 24, and a crack CR occurs between adjacent holding holes 21, 22, starting from the groove 23, in the holder 20 (see FIG. 9). By dividing the holder 20 (the battery assembly 1) by taking, as a boundary, the cracks CR and that part of the inner peripheral surface 21h, 22h of the holding hole 21, 22 which is placed between two cracks CR adjacent to each other in a circumferential direction of the holding hole 21, 22 (or an inner peripheral surface of the adhesive 30 joined to this part of the inner peripheral surface 21h, 22h), the outer peripheral surface 15b of that part (the hole-inside part 15) which is placed inside the holding hole 21, 22 (or the surface of the adhesive 30 adhered to the outer peripheral surface 15b of the hole-inside part 15) can be partially exposed outside (see FIG. 10), in terms of the battery 10 inserted into the holding hole 21, 22 to which the grooves 23, 24 as starting points of the cracks CR are connected. As such, the battery 10 in which the outer peripheral surface 15b of the hole-inside part 15 (or the surface of the adhesive 30 adhered to the outer peripheral surface 15b of the hole-inside part 15) is partially exposed can be easily taken out from the holder 20 (can be separated from the holder 20; see FIG. 11).

Note that, in the present embodiment, since the grooves 23, 24 are formed over the whole holder 20 as described above, the holder 20 can be divided (split) starting from the grooves 23, 24 over the whole holder 20. This allows all the batteries 10 fixed to the holder 20 to be easily taken out from the holder 20 (to be easily separated from the holder 20).

Figure 7:
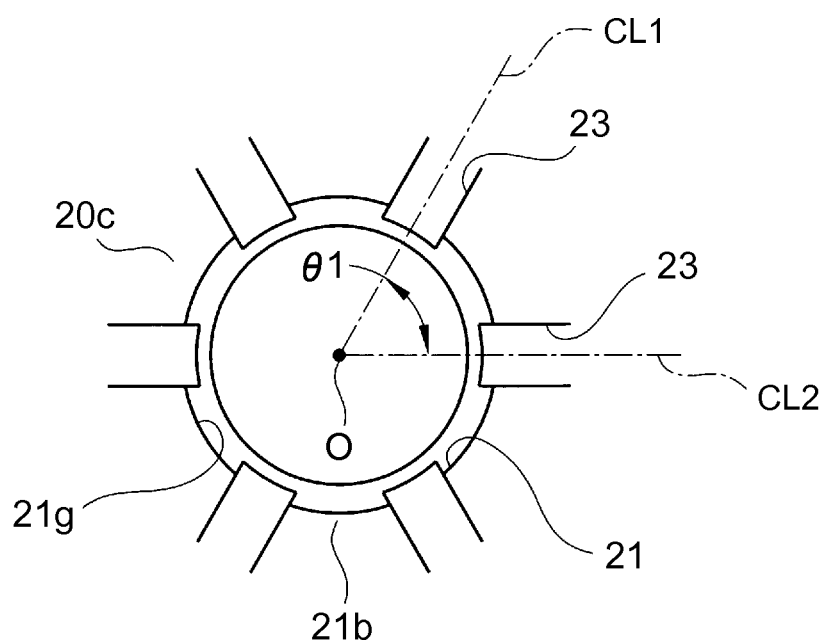
FIG. 7 is an enlarged view of a part E in FIG. 4.

Further, in the battery assembly 1 of the present embodiment, as illustrated in FIG. 7, when a plurality of grooves 23 extending from the same groove 21 in a radial direction is viewed in a plan view from that back-surface-20c side of the holder on which the grooves 23 are opened, an angle θ1 formed between any two grooves 23 adjacent to each other in the circumferential direction of the holding hole 21 is 180° or less. That is, any of the holding holes 21 formed in the holder 20 satisfies θ1≤180°. More specifically, in terms of the holding hole 21 illustrated in FIG. 7, θ1=60° is satisfied.

Note that the "angle formed between two grooves 23 adjacent to each other in the circumferential direction of the holding hole 21" indicates an angle θ1 formed by center lines CL1 and CL2 of two adjacent grooves 23 when the holder 20 is viewed in a plan view from that back-surface-20c side of the holder 20 on which the two grooves 23 are opened (note that the center lines CL1, CL2 are segments having a length extending to a center O of the holding hole 21), as illustrated in FIG. 7.

Figure 8:
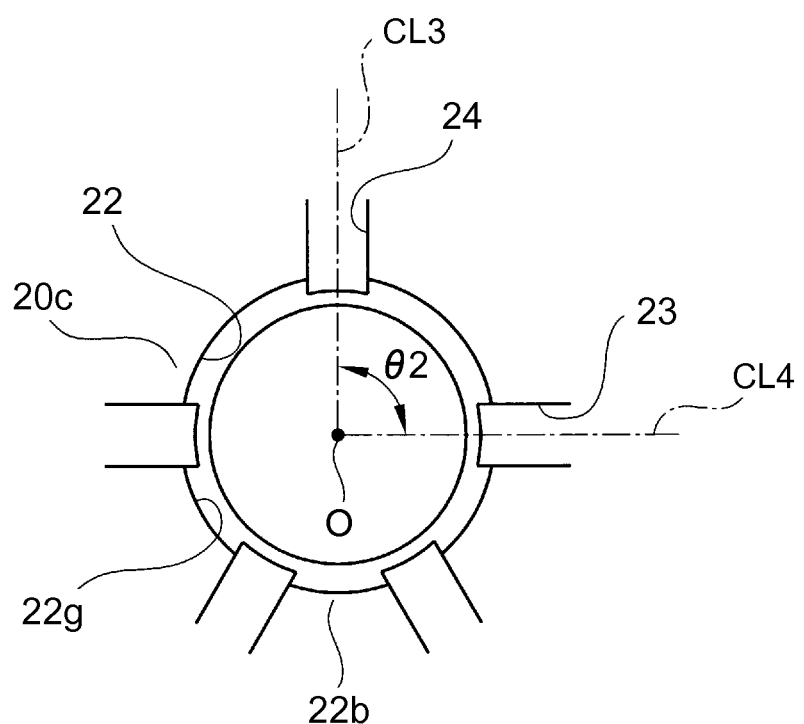
FIG. 8 is an enlarged view of a part F in FIG. 4.

Further, as illustrated in FIG. 8, when a plurality of grooves 23, 24 extending from the same groove 22 in a radial direction is viewed in a plan view from that back-surface-20c side of the holder on which the grooves 23, 24 are opened, an angle θ2 formed between two grooves 23, 24 adjacent to each other in the circumferential direction of the holding hole 22 is 180° or less. That is, any of the holding holes 22 formed in the holder 20 satisfies θ2≤180°. More specifically, in terms of the holding hole 22 illustrated in FIG. 8, θ2 is 90° or 60°.

Note that the "angle formed between two grooves 23, 24 adjacent to each other in the circumferential direction of the holding hole 22" indicates an angle θ2 formed by center lines CL3 and CL4 of two adjacent grooves 23, 24 when the holder 20 is viewed in a plan view from that back-surface-20c side of the holder 20 on which the two grooves 23, 24 are opened (note that the center lines CL3, CL4 are segments having a length extending to a center O of the holding hole 22) as illustrated in FIG. 8.

Since θ1≤180° and θ2≤180° are satisfied as such, when an impact is given to the holder 20 to cause cracks CR between adjacent holding holes 21, 22, starting from the grooves 23, 24, the holder 20 (the battery assembly 1) is easily divided by taking, as a boundary, the cracks CR and that part of the inner peripheral surface 21h, 22h of the holding hole 21, 22 which is placed between two cracks CR adjacent to each other in the circumferential direction of the holding hole 21, 22 (or the inner peripheral surface of the adhesive joined to this part of the inner peripheral surface 21h, 22h). This is because such a problem does not occur that, at the time of dividing of the holder 20 (the battery assembly 1), the battery 10 placed at the boundary abuts with the inner peripheral surface 21h, 22h of the holding hole 21, 22 and prevents the dividing of the holder 20 (the battery assembly 1).

Figure 10:
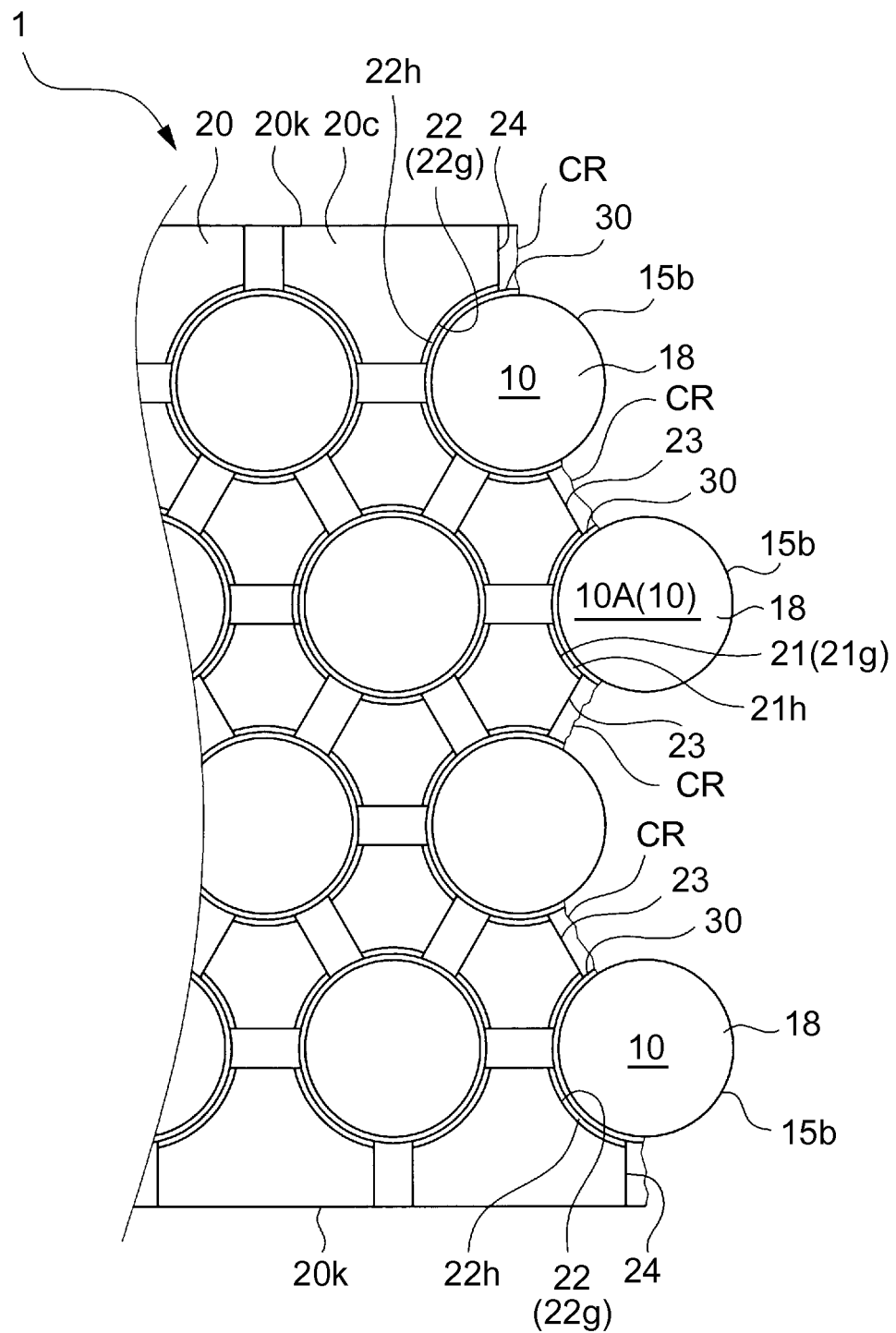
FIG. 10 is another view to describe the method of taking out the battery from the holder.

Furthermore, by removing one or more parts of the holder 20 which are sandwiched between those grooves 23, 24 adjacent to each other in the circumferential direction of the holding hole 21, 22 in which cracks CR occur (in addition, a part that includes at least half of a circumference of the inner peripheral surface 21h, 22h of the holding hole 21, 22), a part corresponding to at least half (with a central angle of 180° or more) of the outer peripheral surface 15b of that part (the hole-inside part 15) of the battery 10 inserted into the holding hole 21, 22 which is placed inside the holding hole 21, 22 (or the surface of the adhesive 30 adhered to the outer peripheral surface 15b of the hole-inside part 15) can be exposed outside (for example, see a battery 10A illustrated in FIG. 10). This allows the battery 10 to be more easily taken out from the holder 20 (to be easily separated from the holder 20).

Figure 12:
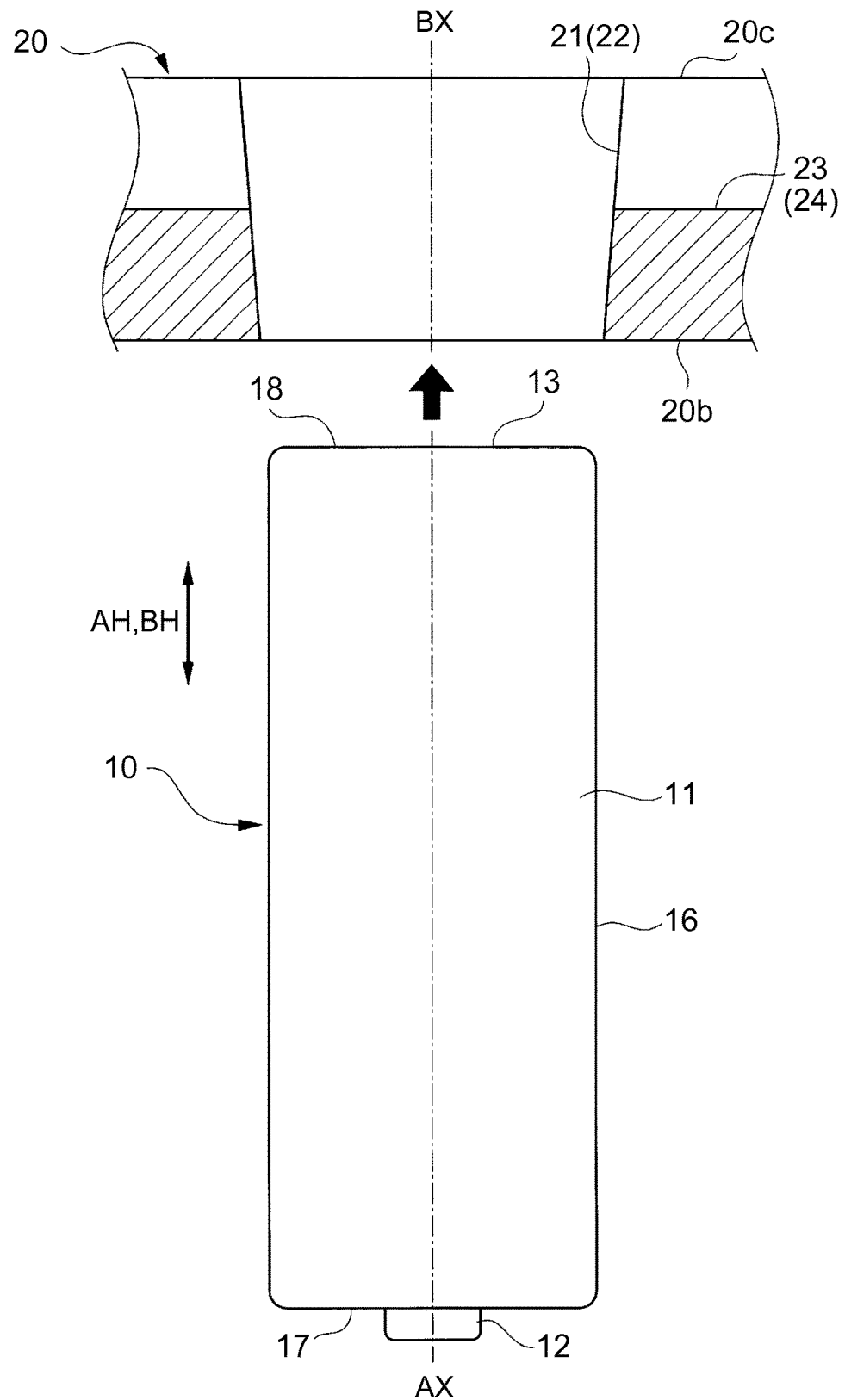
FIG. 12 is a view to describe a manufacturing method of a battery assembly.

Next will be described a manufacturing method of a battery assembly according to the present embodiment. First, a predetermined number of batteries 10 and a holder 20 are prepared. Note that the holder 20 can be manufactured by aluminum die casting, for example. Then, in a cell insertion step, the battery 10 is inserted into a holding hole 21, 22 of the holder 20, as illustrated in FIG. 12. More specifically, in a state where a back surface 20c of the holder 20 is directed upward (a front surface 20b is directed downward), the battery 10 is inserted into the holding hole 21, 22 from a front-surface-20b side of the holder 20. Note that the battery 10 is inserted into the holding hole 21, 22 from a negative-terminal-13 side (a second-surface-18 side), and in a state where a position of a negative terminal 13 (a second surface 18) accords with the back surface 20c of the holder 20 in an axis direction BH of the holding hole 21, 22, the battery 10 is temporarily held by a jig (not shown) (see FIG. 13).

Figure 13:
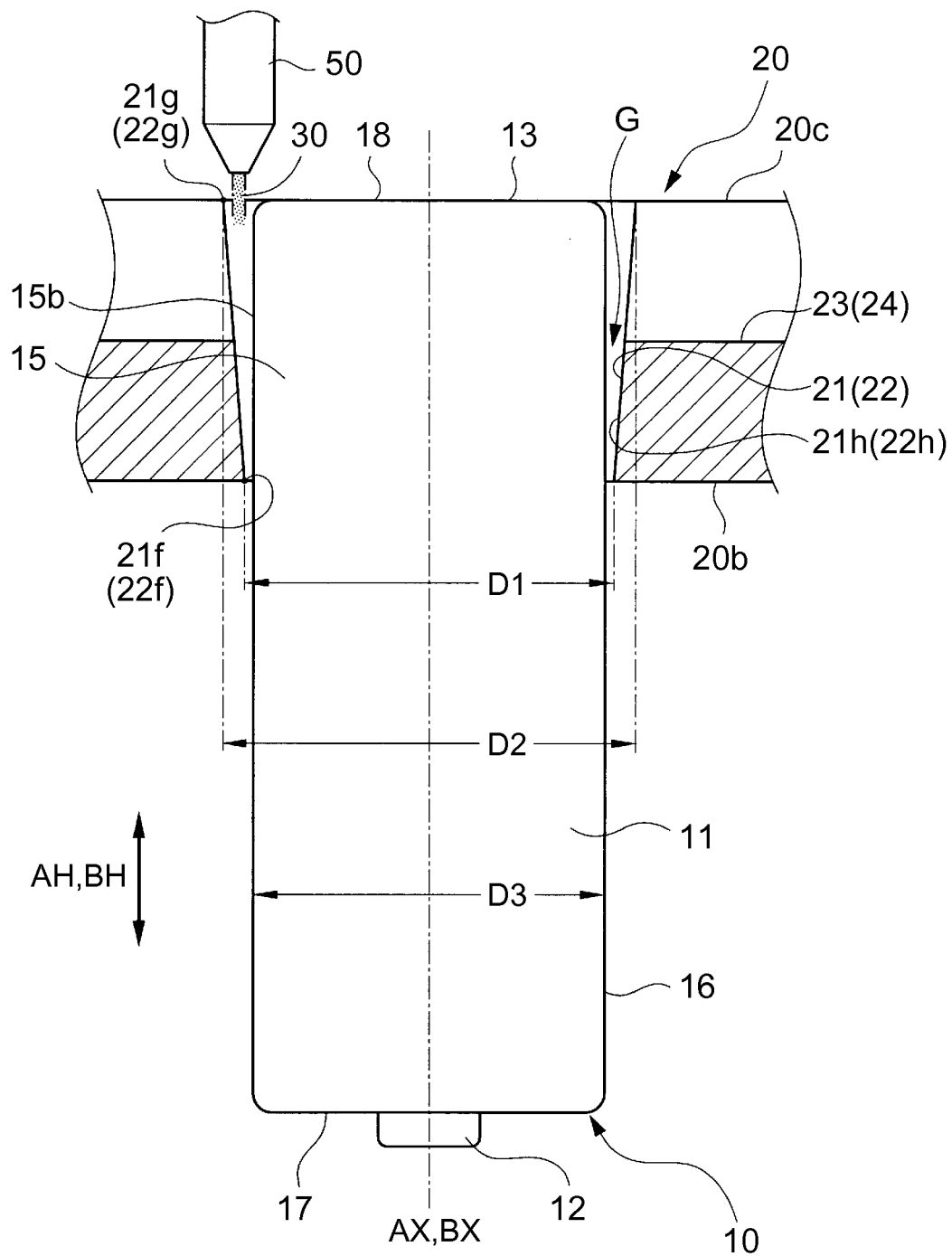
FIG. 13 is another view to describe the manufacturing method of the battery assembly.

Subsequently, the process proceeds to an adhesive injection step, in which an adhesive 30 is injected into a gap G between an outer peripheral surface 15b of that part (a hole-inside part 15) of the battery 10 which is placed inside the holding hole 21, 22 and that inner peripheral surface 21h, 22h of the holder 20 which constitutes the holding hole 21, 22. More specifically, as illustrated in FIG. 13, in a state where the back surface 20c of the holder 20 is directed upward (the front surface 20b is directed downward), the adhesive 30 is injected into the gap G from a back-surface-20c side of the holder 20. Note that, in the present embodiment, a nozzle 50 connected to a dispenser (not shown) is placed above the gap G of the holder 20, and the adhesive 30 discharged downward from the nozzle 50 is injected into the gap G.

In the meantime, in the present embodiment, the holder 20 configured such that "an inside diameter D1 of a circular front-surface-side open end 21f, 22f, which is an open end of the holding hole 21, 22 on the front-surface-20b side, is made smaller than an inside diameter D2 of a circular back-surface-side open end 21g, 22g, which is an open end of the holding hole 21, 22 on the back-surface-20c side" is used (see FIG. 13). As such, since the inside diameter D2 (a diameter) of the back-surface-side open end 21g, 22g is made larger than the inside diameter D1 (a diameter) of the front-surface-side open end 21f, 22f, the adhesive 30 easily comes inside the gap G at the time when the adhesive 30 is injected into the gap G from the back-surface-20c side in a state where the back surface 20c of the holder 20 is directed upward (the front surface 20b is directed downward). Further, since the inside diameter D1 of the front-surface-side open end 21f, 22f is smaller than the inside diameter D2 of the back-surface-side open end 21g, 22g, the adhesive 30 thus injected from the back-surface-20c side is hard to drop downward from the front-surface-20b side at the time when the adhesive 30 is injected into the gap G, as described above.

Besides, in the holder 20 used in the present embodiment, the inner peripheral surface 21h, 22h that constitutes the holding hole 21, 22 is a tapered surface having an inside diameter that is increased from the front-surface-20b side toward the back-surface-20c side (see FIG. 13). On this account, when the adhesive 30 is injected into the gap G as described above, the adhesive 30 thus injected from the back-surface-20c side easily flows toward the front-surface-20b side along the inner peripheral surface 21h, 22h, which makes it possible to smoothly fill the adhesive 30 into the gap G.

Figure 14:
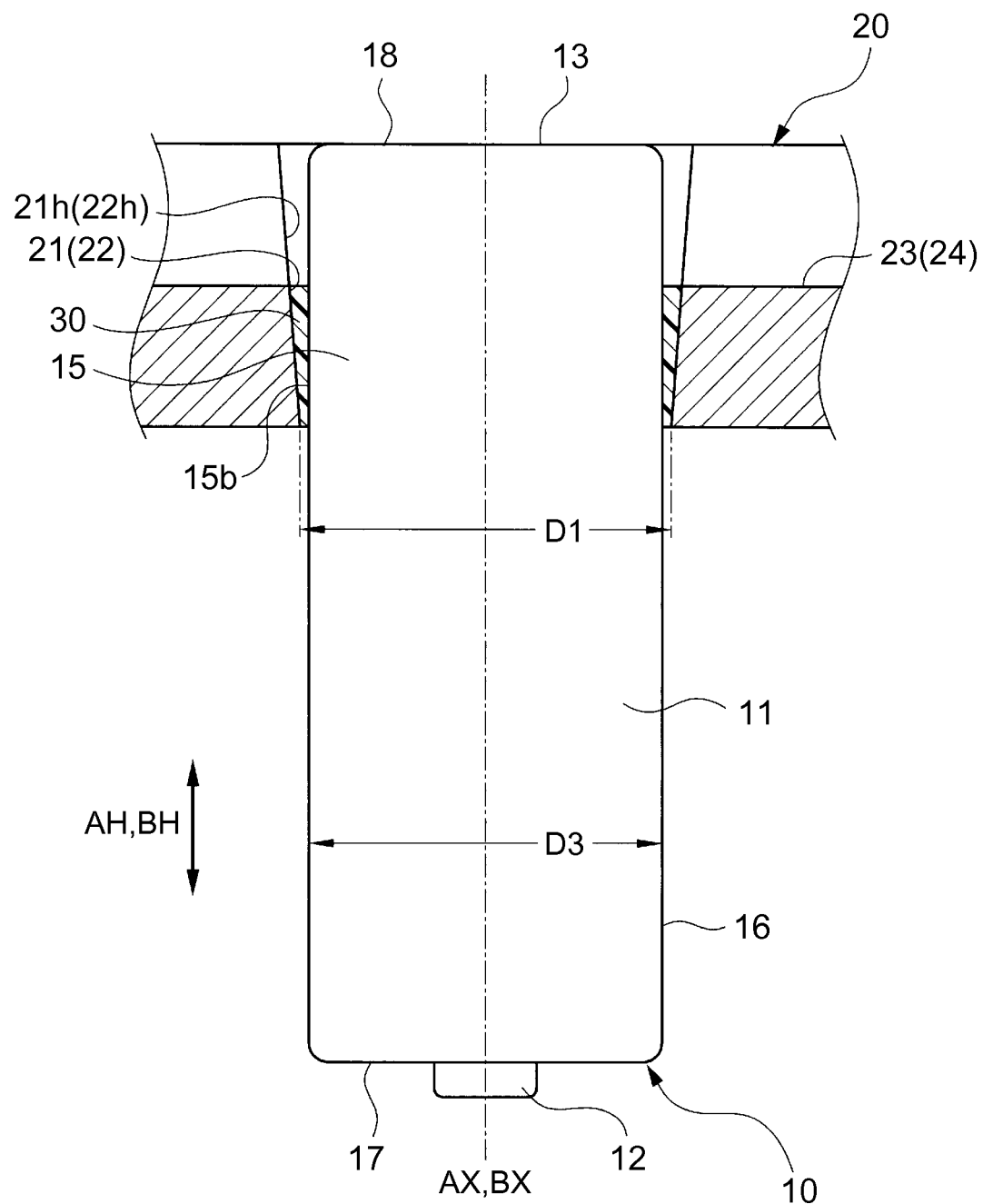
FIG. 14 is another view to describe the manufacturing method of the battery assembly.

After that, as illustrated in FIG. 14, the adhesive 30 thus injected solidifies (the adhesive 30 is solidified), so that each of the batteries 10 is fixed to the holder 20 in a state where the each of the batteries 10 is joined, via the adhesive 30, to the inner peripheral surface 21h, 22h that constitutes the holding hole 21, 22. Hereby, the battery assembly 1 is completed.

Next will be described a method of taking out the battery 10 from the holder 20 in the battery assembly 1 of the present embodiment. First, an impact is applied to the holder 20 of the battery assembly 1. A method of applying an impact to the holder 20 includes, for example, a method in which the holder 20 is hit by a hammer or the like, a method in which the battery assembly 1 is dropped down to a floor, and so on. Hereby, as illustrated in FIG. 9, in the holder 20, a crack CR occurs between the holding hole 22 and the outer peripheral side surface 20k of the holder 20, starting from the groove 24, and a crack CR occurs between adjacent holding holes 21, 22, starting from the groove 23. Note that, at this time, the battery 10 may be partially deformed, but the battery 10 is subsequently disassembled for recycling, so it is fine for the battery 10 to be deformed.

Subsequently, the holder 20 (the battery assembly 1) is divided by taking, as a boundary, the cracks CR thus caused due to the impact and that part of the inner peripheral surface 21h, 22h of the holding hole 21, 22 which is placed between two cracks CR adjacent to each other in the circumferential direction of the holding hole 21, 22 (or an inner peripheral surface of the adhesive 30 joined to the inner peripheral surface 21h, 22h). Note that, since the battery 10 is joined to the holder 20 via the adhesive 30, even if an impact is just applied to the holder 20 as described above, the holder 20 may still have a part that is not divided at the cracks CR as a boundary (a part that is still joined via the adhesive 30). Such a part is divided in such a manner that that outer peripheral surface 15b of the battery 10 which is joined via the adhesive 30 is pulled off from the inner peripheral surface 21h, 22h (a part sandwiched between the cracks CR in the circumferential direction) of the holding hole 21, 22 of the holder 20.

Hereby, as illustrated in FIG. 10, for example, in terms of the battery 10 inserted into the holding hole 21, 22 to which the grooves 23, 24 as starting points of the cracks CR are connected, the outer peripheral surface 15b of that part (the hole-inside part 15) which is placed inside the holding hole 21, 22 (or the surface of the adhesive 30 adhered to the outer peripheral surface 15b of the hole-inside part 15) can be exposed outside.

Figure 11:
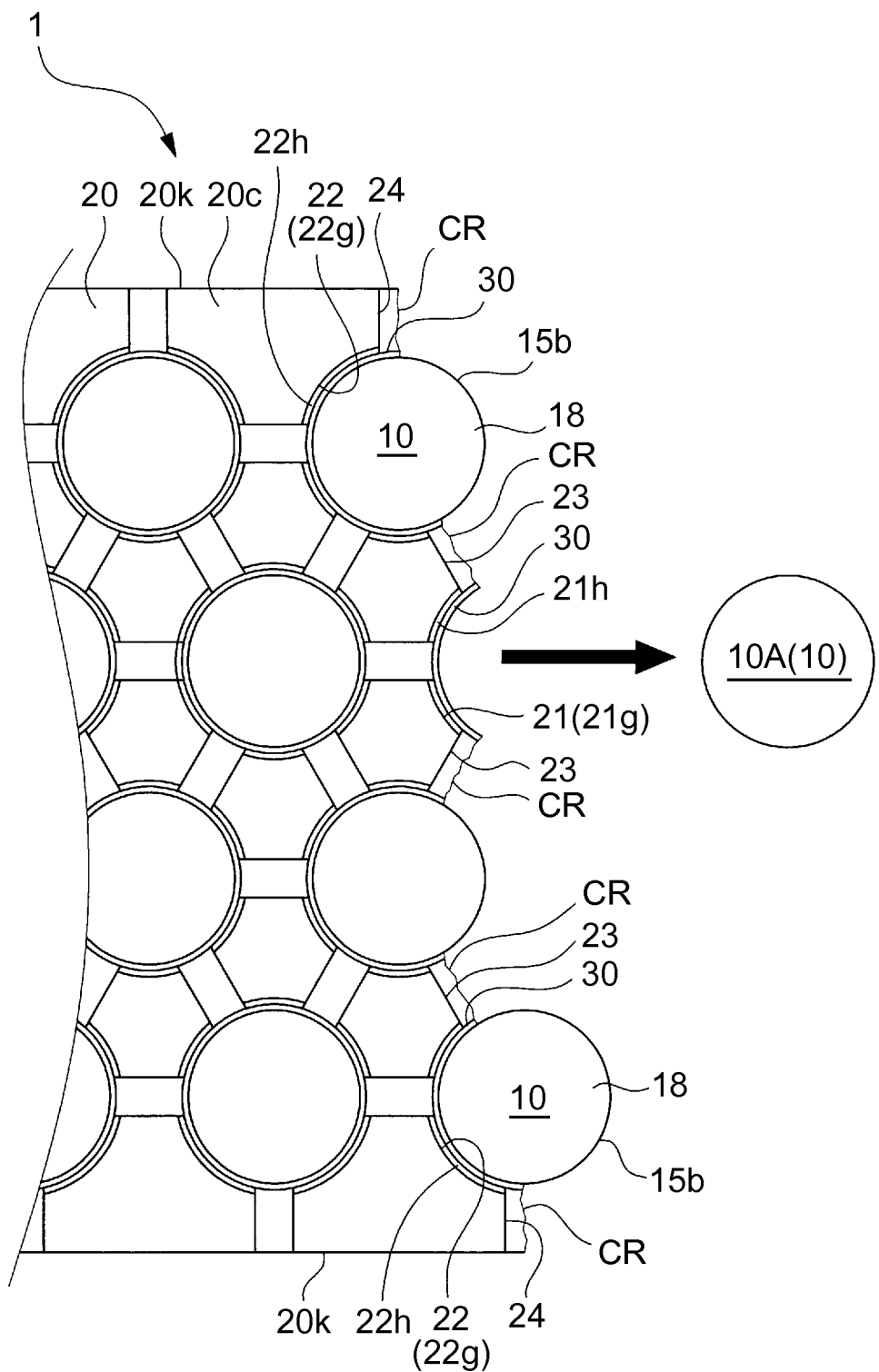
FIG. 11 is another view to describe the method of taking out the battery from the holder.

Subsequently, as illustrated in FIG. 11, the battery 10 in which the outer peripheral surface 15b of the hole-inside part 15 (or the surface of the adhesive 30 adhered to the outer peripheral surface 15b of the hole-inside part 15) is exposed is taken out from the holder 20. More specifically, the battery 10A in which at least half (with a central angle of 180° or more) of a circumference of the outer peripheral surface 15b (or the surface of the adhesive 30 adhered to the outer peripheral surface 15b) is exposed is pulled outward while the battery 10A is held by a hand and pulled outward, so that the battery 10A is taken out from the holder 20. Since that part of the outer peripheral surface 15b of the battery 10A which is not exposed is partially joined, via the adhesive 30, to the inner peripheral surface 21h, 22h of the holding hole 21, 22 of the holder 20, this joint part is pulled off, so as to take out the battery 10A from the holder 20.

After that, the above operation is repeated, so that all the batteries 10 fixed to the holder 20 can be taken out (removed) from the holder 20. Thus, the battery 10 can be easily taken out from the holder 20 in the battery assembly 1 of the present embodiment. This is because the holder 20 of the present embodiment has the grooves 23, 24. Accordingly, it can be said that the battery assembly 1 of the present embodiment is a battery assembly in which the battery 10 is easily taken out from the holder 20 though the battery 10 is firmly fixed to the holder 20 via the adhesive 30. Further, it can be said that the holder 20 of the present embodiment has a structure in which the battery 10 can be easily taken out therefrom (the battery 10 can be easily separated therefrom).

The present invention has been described above in line with the embodiment, but the present invention is not limited to the above embodiment and can be modified and applied appropriately without departing from the gist of the present invention.

What is claimed is:

1. A battery assembly comprising:
a holder having a front surface and a back surface and having a plurality of holding holes, which are cylindrical holes penetrating through between the front surface and the back surface; and
a cylindrical battery extending in an axis direction and having an outside diameter smaller than a minimum inside diameter of the holding hole, wherein:
at least part of the battery is accommodated in the holding hole, and the battery extends out from the front surface of the holder, each holding hole of the plurality of holding holes has a first inside diameter at a first end of the holding hole located at the front surface and a second inside diameter at a second end of the holding hole located at the back surface, and the holding hole tapers from the first inside diameter to the second inside diameter, wherein the second inside diameter is the minimum inside diameter;
an adhesive is provided between an outer peripheral surface of the part of the battery and an inner peripheral surface of the holding hole so as to fix the battery to the holder; and
the holder has grooves each of which is opened on the back surface of the holder, each of the grooves making adjacent holding holes among the plurality of holding holes communicate with each other,
wherein the cylindrical battery is accommodated in the holder such that a terminal of the battery that is accommodated in the holding hole protrudes past a bottom surface of the grooves as viewed in a side view.

2. The battery assembly according to claim 1, wherein the grooves which are opened on the back surface of the holder extend to an outer peripheral side surface of the holder from an outer-peripheral-side holes among the holding holes which are placed adjacent to the outer peripheral side surface of the holder.

3. The battery assembly according to claim 1, wherein:
the grooves are configured to extend in a radial direction of the holding hole;
the grooves extend from each of the holding holes formed in the holder; and
when a plurality of the grooves extending from the holding hole in its radial direction is viewed in a plan view from a back-surface side of the holder on which the grooves are opened, an angle formed between any two adjacent grooves is 180° or less.

4. The battery assembly according to claim 1, wherein a depth of the grooves is half of a dimension between the front surface and the back surface in the holder.

5. The battery assembly according to claim 4, wherein the adhesive is provided between a bottom face of one of the grooves and an opposite surface of a surface on which the groove is opened.

6. A holder comprising:
a front surface and a back surface;
a plurality of holding holes, which are cylindrical holes penetrating through between the front surface and the back surface;
each holding hole of the plurality of holding holes has a first inside diameter at a first end of the holding hole located at the front surface and a second inside diameter at a second end of the holding hole located at the back surface, and the holding hole tapers from the first inside diameter to the second inside diameter;
at least part of a cylindrical battery is able to be accommodated in the holding hole, and the battery extends out from the front surface of the holder; and
the holder has grooves each of which is opened on the back surface, each of the grooves making adjacent holding holes among the plurality of holding holes communicate with each other,
wherein all of the plurality of holding holes that are adjacent to each other are communicated with each other via the grooves.

7. The holder according to claim 6, wherein the grooves which are opened on the back surface of the holder extend to an outer peripheral side surface of the holder from an outer-peripheral-side holes among the holding holes which are placed adjacent to the outer peripheral side surface of the holder.

8. The holder according to claim 6, wherein the grooves are configured to extend in a radial direction of the holding hole;

the grooves extend from each of the holding holes formed in the holder; and when a plurality of the grooves extending from the holding hole in its radial direction is viewed in a plan view from a back-surface side of the holder on which the grooves are opened, an angle formed between any two adjacent grooves is 180° or less.

* * * * *